US009868239B2

(12) United States Patent
Brand et al.

(10) Patent No.: US 9,868,239 B2
(45) Date of Patent: Jan. 16, 2018

(54) MOLD POSITIONING DEVICE

(71) Applicant: HUSKY INJECTION MOLDING SYSTEMS LTD., Bolton (CA)

(72) Inventors: Dietmar Tiemo Brand, North York (CA); Ralf Walter Fisch, Sarrebourg (DE); Sven Kmoch, Platten (DE); Andre Axel Kromberg, Newmarket (CA); Adrian Peter Looije, Aurora (CA); Peter Adrian Looije, Newmarket (CA); Ruud Luijs, VR Utrecht (NL); Jan Marius Manda, Toronto (CA); Renato Papa, Scarborough (CA); Dirk Holger Schlums, Mansfield (CA); Alex Teng, Richmond Hill (CA); Jean-Christophe Witz, Yutz (FR); Bruno Giuseppe Sodaro, Erin (CA); Maxfield Paul Bradshaw, Etobicoke (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 112 days.

(21) Appl. No.: 14/760,301

(22) PCT Filed: Dec. 6, 2013

(86) PCT No.: PCT/CA2013/050938
§ 371 (c)(1),
(2) Date: Jul. 10, 2015

(87) PCT Pub. No.: WO2014/121372
PCT Pub. Date: Aug. 14, 2014

(65) Prior Publication Data
US 2015/0352766 A1  Dec. 10, 2015

Related U.S. Application Data

(60) Provisional application No. 61/761,354, filed on Feb. 6, 2013, provisional application No. 61/840,095, filed
(Continued)

(51) Int. Cl.
*B29C 45/17* (2006.01)
*B29C 45/80* (2006.01)

(52) U.S. Cl.
CPC .......... *B29C 45/80* (2013.01); *B29C 45/1742* (2013.01)

(58) Field of Classification Search
CPC ............ B29C 45/1742; B29C 45/1743; B29C 45/2606; B29C 2045/0491
See application file for complete search history.

(56) References Cited

U.S. PATENT DOCUMENTS 4,473,346 A    9/1984 Hehl
5,096,405 A *  3/1992 Pace .................... B29C 45/1742
                                                    425/192 R
(Continued)

FOREIGN PATENT DOCUMENTS

EP   1775089 A1    4/2007
JP   S58175024 U   11/1983
(Continued)

OTHER PUBLICATIONS

European Search Report, dated Dec. 22, 2016, 8 pages.
PCT International Search Report; Cuerrier, Pierre; dated Dec. 18, 2013; 5 pages.

*Primary Examiner* — Jill L Heitbrink

(57) ABSTRACT

Disclosed herein, amongst other things, are structure and steps for positioning a first mold part of a mold on a mold mounting face in an injection molding machine. In particular, the structure and steps may include a positioner that is
(Continued)

configured to connect the first mold part to part of the injection molding machine, wherein the positioner is adjustable to position the first mold part across the mold mounting face.

27 Claims, 13 Drawing Sheets

Related U.S. Application Data on Jun. 27, 2013, provisional application No. 61/875,764, filed on Sep. 10, 2013.

(56) References Cited

U.S. PATENT DOCUMENTS

| | | | |
|---|---|---|---|
| 5,333,369 | A | 8/1994 | Miyairi et al. |
| 5,858,422 | A * | 1/1999 | Brams .................. B22D 17/26 100/258 A |
| 2003/0185930 | A1 | 10/2003 | Hechtl |
| 2005/0218545 | A1 | 10/2005 | Hakoda et al. |
| 2008/0174038 | A1 | 7/2008 | Glaesener et al. |

FOREIGN PATENT DOCUMENTS

| | | |
|---|---|---|
| JP | H0230509 A | 1/1990 |
| JP | 2003320570 A | 11/2003 |
| JP | 2012116100 A | 6/2012 |

* cited by examiner

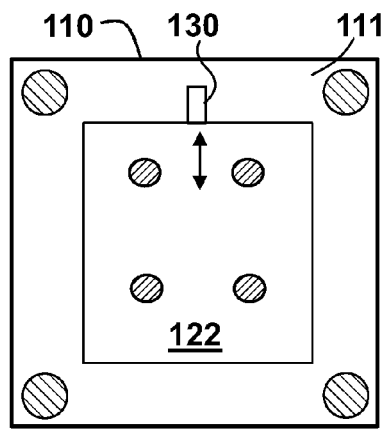
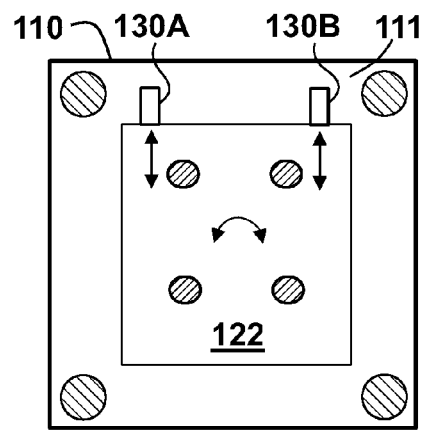
FIG. 3A  FIG. 3B
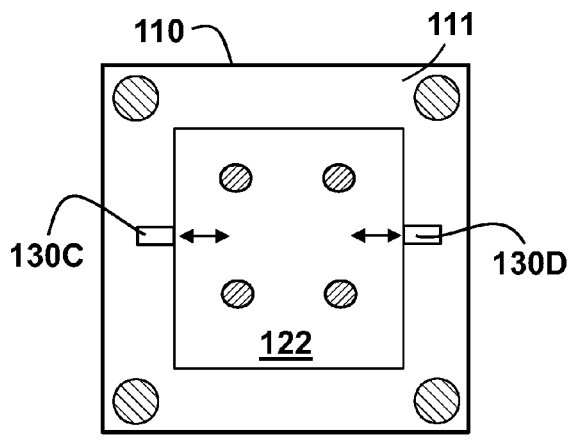
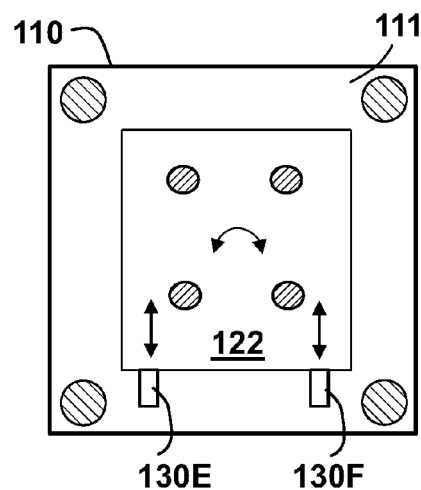
FIG. 3C  FIG. 3D

US 9,868,239 B2

MOLD POSITIONING DEVICE

TECHNICAL FIELD

Non-Limiting embodiments disclosed herein generally relate to structure and steps for positioning a mold on a mold mounting face in an injection molding machine, and more specifically for aligning parts of the mold while mounted in the molding machine.

SUMMARY

In accordance with an aspect disclosed herein, there is provided a structure for positioning a first mold part on a mold mounting face in an injection molding machine. The structure includes a positioner that is configured to connect the first mold part to part of the injection molding machine, wherein the positioner is adjustable to position the first mold part on the mold mounting face.

In accordance with another aspect disclosed herein, there is provided a method of operating an injection molding machine. The method includes positioning a first mold part of a mold on a mold mounting face using a positioner.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which:

FIG. 3A depicts a schematic front view of a first mold part of a mold on a first platen of an injection molding machine and of a positioner linked therebetween in accordance with the first non-limiting embodiment otherwise shown in FIG. 2;

FIG. 3B depicts a schematic front view of the first mold part on the first platen and of a pair of positioner linked therebetween in accordance with a second non-limiting embodiment;

FIG. 3C depicts a schematic front view of the first mold part on the first platen and of the pair of positioner linked therebetween in accordance with a third non-limiting embodiment;

FIG. 3D depicts a schematic front view of the first mold part on the first platen and of the pair of positioner linked therebetween in accordance with a fourth non-limiting embodiment;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of structure and steps for positioning a first mold part of a mold on a platen of an injection molding machine. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

In an injection molding system it may occur that parts of a mold that are mounted to platens of a mold clamp may become misaligned. Various factors may influence the alignment of the parts of the mold. For example, a platen of an injection molding machine may tilt causing misalignment of part of a mold that is associated therewith with respect to another part of the mold that is associated with a second platen of the machine. In addition to platen tilting it can happen that the mold part can move or otherwise shift on the mold mounting face of the platen over time due to operational loads placed thereon such as, for example, shock (dynamic loads), platen deformation and other effects. In yet another example a base that supports the platens may go out of alignment necessitating a correction to the alignment of the parts of the mold.

Figure 1:
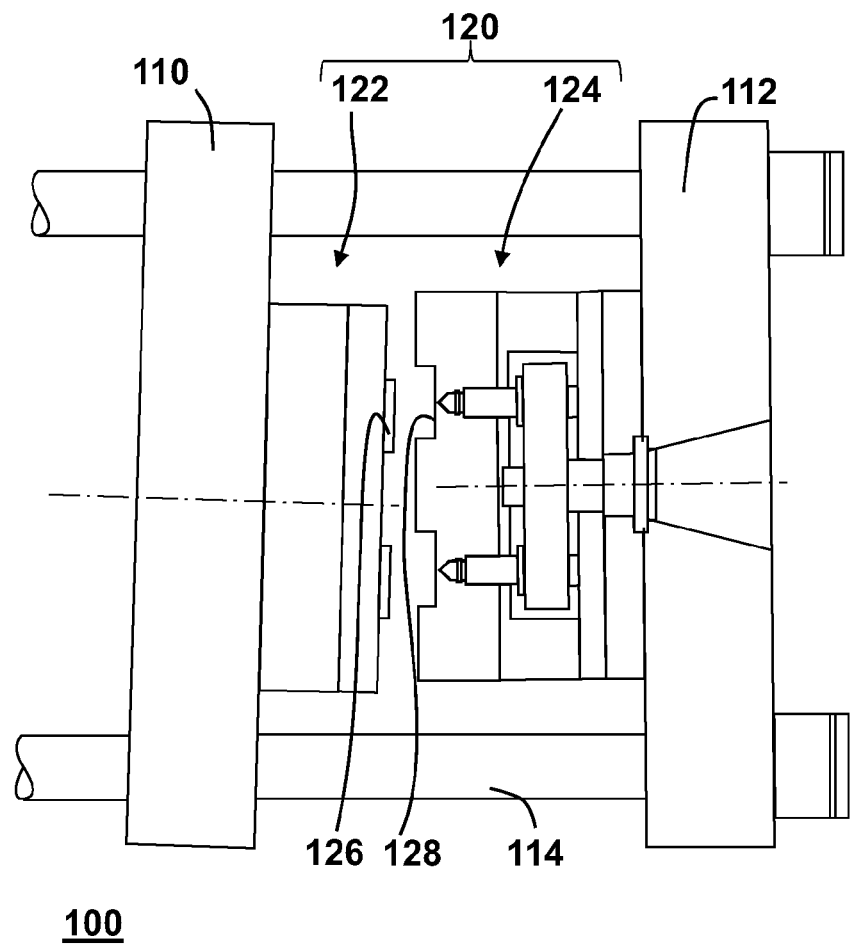
FIG. 1 depicts a schematic representation of an injection molding system in accordance with the prior art.

The foregoing may be appreciated with reference to the schematic representation of an injection molding system depicted in FIG. 1. The injection molding system includes, amongst other things, an injection molding machine 100 and a mold 120 mounted therein. The injection molding machine 100 includes, amongst other things, a pair of platens, specifically a first platen and a second platen 112 that are linked together by a set of tie bars 114. A first mold part 122 of the mold 120 is associated with the first platen and a second mold part 124 of the mold 120 is associated with the second platen 112. In operation, the first platen 110 is moveable relative to the second platen 112 by means of a clamp stroke actuator (not shown) for opening and closing of the mold 120. In addition, a clamp actuator (not shown) is engageable to clamp the mold 120 in the closed configuration during injection mold molding material into the mold 120. The first platen 110 is shown to be tilted due to the weight of the first mold part 122 that is cantilevered thereon. The tilting of the first platen 110 has been exaggerated to visually illustrate the potential for misalignment between the parts of the mold 120 resulting therefrom.

Disclosed herein, amongst other things, is structure and steps for positioning the first mold part of the mold on the first platen. Broadly speaking the foregoing includes a positioner that is configured to connect the first mold part to part of the injection molding machine, such as, for example, the first platen thereof, wherein the positioner is adjustable to position (e.g. lift, lower, laterally shift or rotate) the first mold part across a mold mounting face of the first platen. Without limiting the general utility of the foregoing, it may be particularly useful to fix alignment issues between the parts of the mold while mounted in the injection molding machine. A technical effect of the foregoing may include, for example, prevention of pre-mature wear of mold components and for ease of mold installation in the injection molding machine.

The structure and steps may also include further means for performing one or more of: appreciating an alignment parameter of the mold; determining an alignment correction having regard to the alignment parameter; notifying an operator of the molding system of the need to correct the alignment of the mold and/or automatically performing an alignment operation by means of manipulating the positioner amongst other things.

Figure 2:
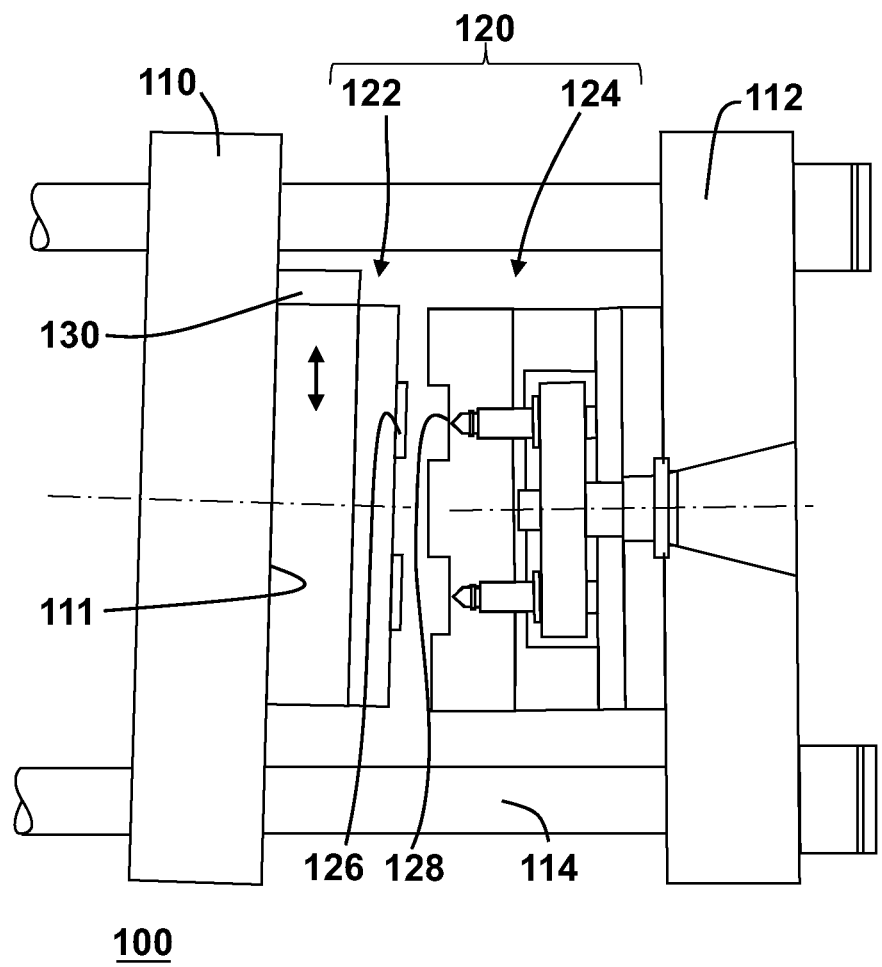
FIG. 2 depicts a schematic representation of an injection molding system in accordance with a first non-limiting embodiment.

With reference to FIG. 2 the injection molding system of FIG. 1 has been further structured to include a non-limiting embodiment of a positioner 130 that is configured to link the first mold part 122 with the first platen 110, wherein the positioner 130 is adjustable to position the first mold part 122 across a mold mounting face 111 of the first platen 110. With further reference to FIG. 3A it may be appreciated that the positioner 130 may be coupled to both the mold mounting face 111 of the first platen 110 and to a top face of the first mold part 122. The structure of the positioner 130 may include any manner of actuator, either manually or automatically operable.

With further reference to FIGS. 3B, 3C and 3D it may be appreciated that the positioner 130 may instead include a plurality of positioners 130A, 130B, 130C, 130D, 130E, 130F that are similarly configured to link the first mold part 122 with the first platen 110, wherein the plurality of positioners 130A, 130B, 130C, 130D, 130E, 130F are adjustable to position (i.e. lift, lower, laterally shift, and/or rotate) the first mold part 122 across the mold mounting face 111 of the first platen 110.

For example, with reference to FIG. 3B it may be appreciated that a pair of positioners 130A and 130B are linked to the top face of the first mold part 122 in a vicinity of sides thereof. As represented by the indicators, the positioners 130A and 130B are selectively operable to coordinate lifting, lowering or rotation of the first mold part 122.

As a further example, with reference to FIG. 3C it may be appreciated that a pair of positioners 130C and 130D are linked to opposite side faces of the first mold part 122 in a vicinity of the middle thereof. As represented by the indicators, the positioners 130C and 130D are selectively operable to coordinate lateral shifting of the first mold part 122.

As yet a further example, with reference to FIG. 3D it may be appreciated that a pair of positioners 130E and 130F are linked to a bottom face of the first mold part 122 in a vicinity of sides thereof. As represented by the indicators, the positioners 130E and 130F are selectively operable to coordinate lifting, lowering or rotation of the first mold part 122.

Figure 4:
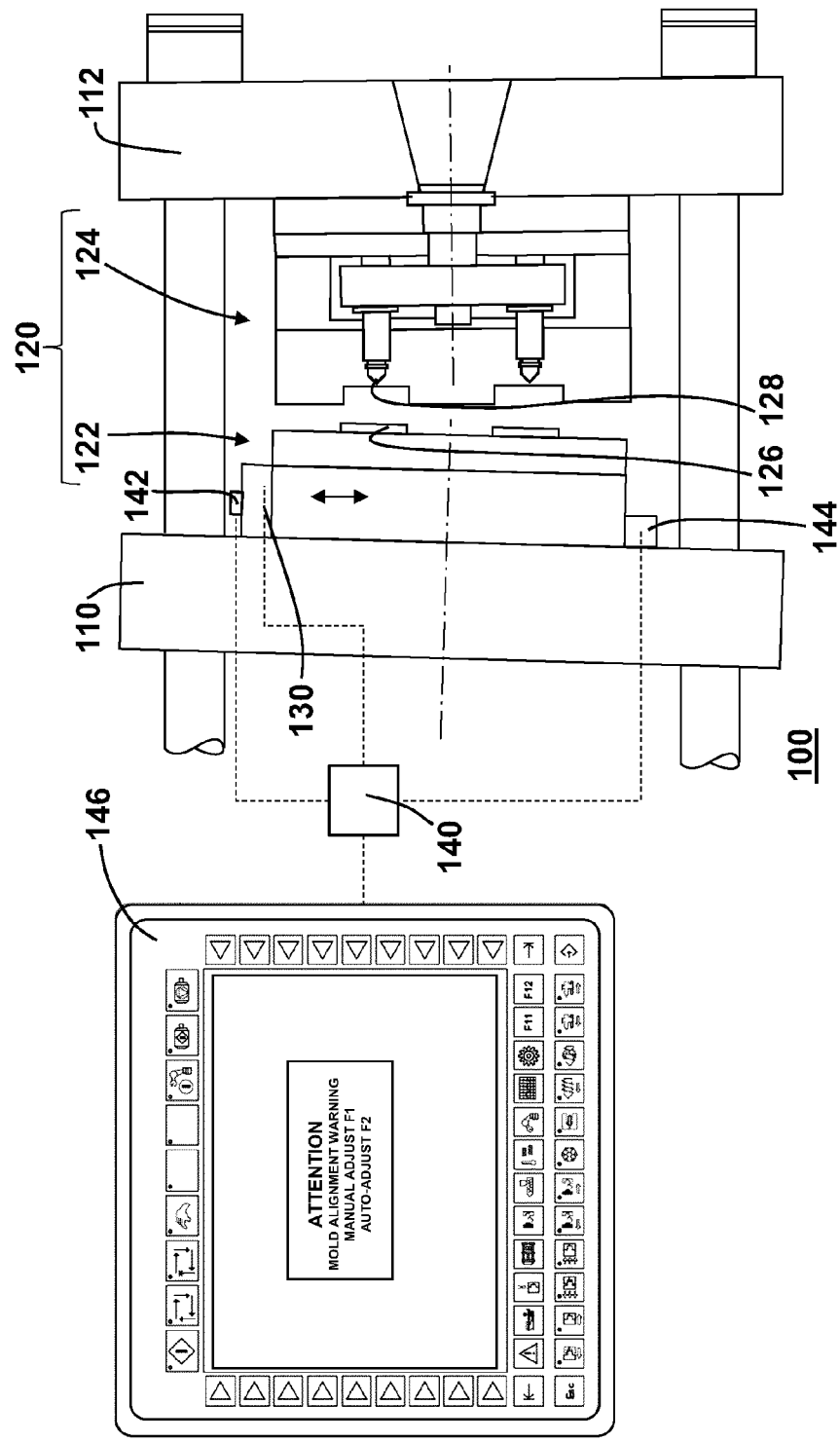
FIG. 4 depicts the schematic representation of the injection molding system of FIG. 2 further including structure for automating aspects of positioning of the first mold part on the first platen.

With reference to FIG. 4, it may be appreciated that the injection molding system may be further augmented with structure for automating aspects of positioning of the first mold part 122. In particular, a sensor 142 may be provided that is configured to provide a feedback signal to a controller 140 with which to appreciate an alignment parameter of the mold 120. The alignment parameter is any information that may be useful in determining the state of alignment between the first mold part 122 and the second mold part 124. The type and placement of the sensor 142 is not particularly limited. For example, the sensor 142 may be a position sensor, and wherein the feedback signal is indicative of a change in position of the first mold part 122 in relation to a reference location such as, for example, the first platen 110 or the second mold part 124. In a further example, a load sensor 144 may be provided beneath the first mold part 122 for detecting a change in position thereof on the first platen 110. Accordingly, the alignment parameter may include one or more of a position of the first mold part 122 on the mold mounting face 111 of the first platen 110 and/or a position of the first mold part 122 relative to the second mold part 124. The controller 140 may be implemented, for example, as a standalone device or as part of a master controller of the injection molding machine 100. The structure of the controller 140 is not particularly limited and may be, for example, any type of industrial control device such as an industrial computer or programmable logic controller capable of executing controller executable instructions (i.e. software stored in a memory device) with which to appreciate the feedback signal(s) to resolve the alignment parameter.

The controller executable instructions may further include instructions with which to determine an alignment correction having regard to the alignment parameter. The alignment correction is one or more values that provide a solution for adjustment of the positioner(s) 130 to re-align the mold part. The alignment correction may be responsive, for example, to one or more of the first mold part 122 having moved on the mold mounting face 111 of the first platen 110 outside of a pre-determined bound and/or the alignment between the first mold part 122 and the second mold part 124 being outside of a pre-determined range.

The controller executable instructions may further include instructions with which to control a display device 146 (e.g. human machine interface, monitoring system, mobile device etc.) that is linked to the molding machine 100 (directly or remotely, by wired or wireless means) to notify the operator thereof of one or both of the alignment parameter and the alignment correction. In this way the operator may undertake manual corrections to the alignment of the mold 120 in accordance therewith with manipulation of the positioner 130. In addition, or instead, the instructions may direct an automated adjustment of the positioner 130 to return the first mold part 122 within one or both of the pre-determined bound and the pre-determined range.

Figure 5:
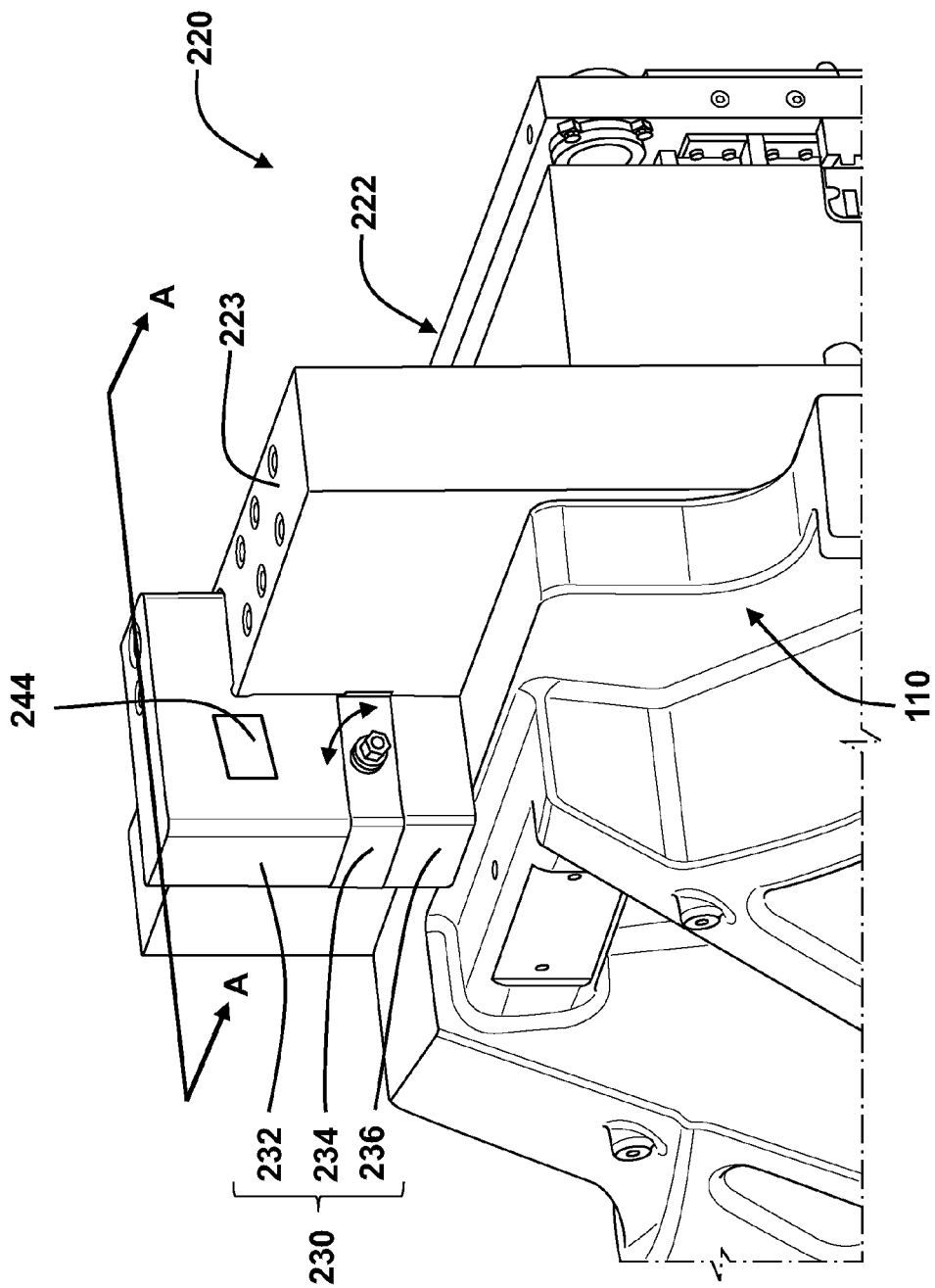
FIG. 5 depicts an isometric view of a fifth non-limiting embodiment of a positioner that links a mold plate of a first mold part with a top of the first platen.
Figure 6:
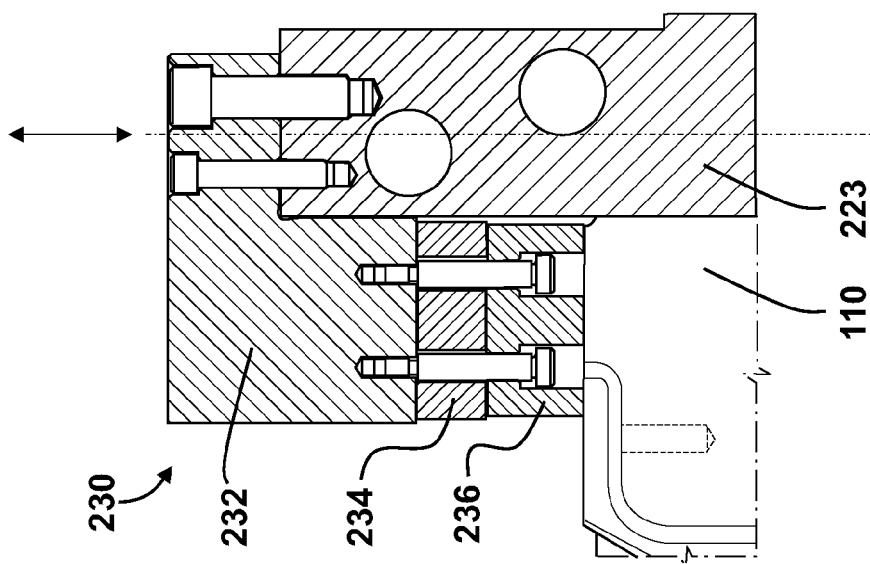
FIG. 6 depicts a cross-sectional view of a portion of the structure of FIG. 5 taken along the section line A-A shown therein.

The description shall now turn to a more specific non-limiting embodiment of the positioner 230 as shown with reference to FIGS. 5 and 6. In particular, the positioner 230 is configured to hang the first mold part 222 from the top of the first platen 110. The positioner 230 includes an adjustment block 232, a base plate 236 and a precision leveler 234, wherein the adjustment block 232 is configured to mount to a top face of a mold plate 223 of the first mold part 222 and to hang over a top face of the first platen 110, the base plate 236 is configured to cooperate with the top face of the first platen 110, and the precision leveler 234 is secured in between the adjustment block 232 and the base plate 236, and wherein the precision leveler 234 is configured to have a dimension X that may be selected to lift or lower the first mold part 222 on the mold mounting face 111 of the first platen 110. While not shown, the positioner 230 may further include structure associated with the base plate which reduces the risk of the mold moving into x-direction (i.e. in the direction of movement of the first platen 110) while the fixturing equipment such as clamps or bolts are released during adjustment. The adjustment block 232 may include a strain gauge sensor 244 for providing the feedback signal to the controller 140 (FIG. 4).

Figure 7A:
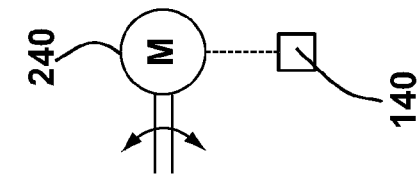
FIG. 7A depicts a schematic representation of a precision leveler for use in the positioner of FIG. 5 in a first operational configuration.
Figure 7A:
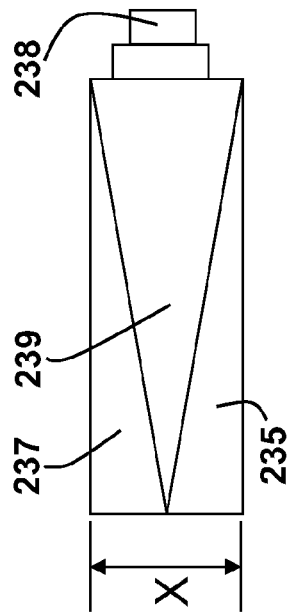
Figure 7B:
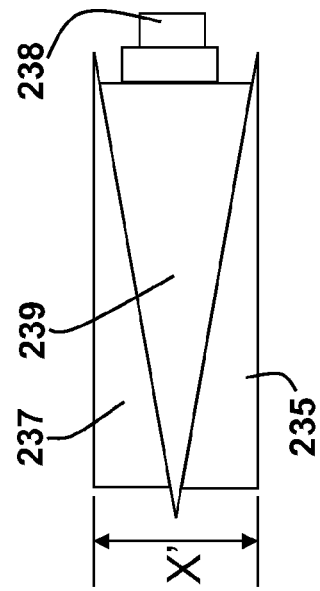
FIG. 7B depicts a schematic representation of the precision leveler of FIG. 7A in a second operational configuration.

A schematic representation of the precision leveler 234 may be appreciated with reference to FIGS. 7A and 7B. The precision leveler 234 may include a first member 235, a second member 237, a wedge 239 and a jack 238. The first member 235 and the second member 237 have complementary surfaces that are inclined to the wedge 239. The jack 238 is configured to position the wedge 239 relative to the first member 235 and the second member 237 such that with repositioning of the wedge relative thereto a dimension X of the precision leveler 234 may be selected. Precision levelers of this variety are commercially available such as, for example, the so-called KSC or KSKC AirLoc Wedgemount® (Trademark of AirLoc Schrepfer Ltd. of Switzerland). An actuator 240 may be provided with which to rotatably adjust the jack 238. The actuator 240 is shown to be connected to the controller 140.

Figure 8:
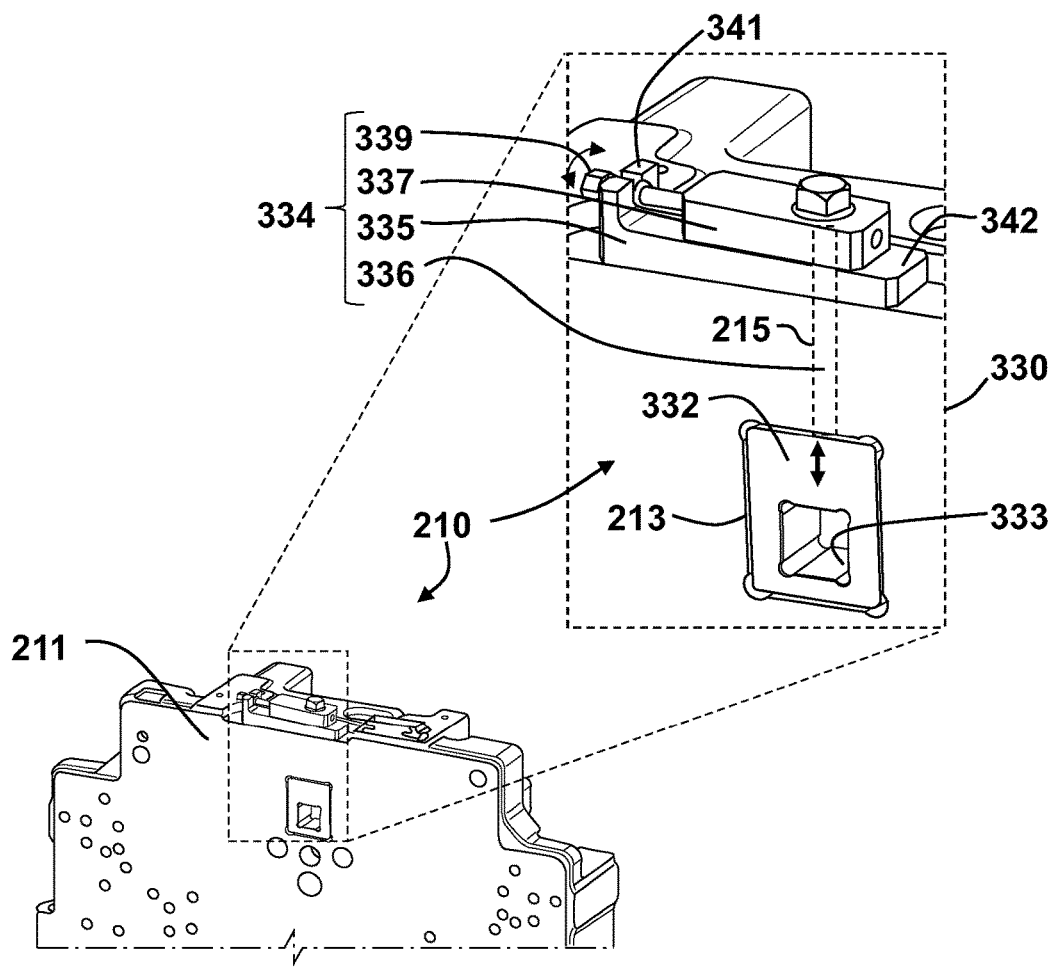
FIG. 8 depicts front isometric views of a sixth non-limiting embodiment of a positioner installed in a first platen of an injection molding machine.
Figure 9:
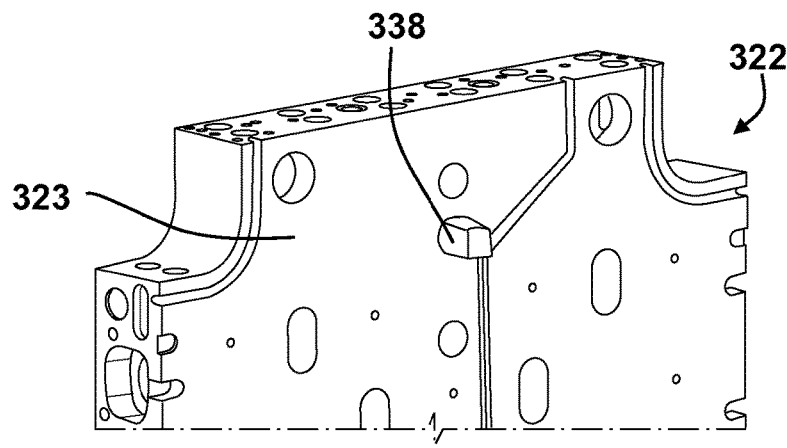
FIG. 9 depicts a rear isometric view of a mold plate of a first mold part that reveals a complementary connection interface on a rear face thereof that is connectable to a mold connection interface on the positioner shown in FIG. 8.

With reference to FIG. 8, there is depicted another non-limiting embodiment of a positioner 330 that is configured to mount to a first platen 210 of an injection molding machine to provide a mold connection interface 333 on the mold mounting face 211. With reference to FIG. 9 it may be appreciated that a complementary connection interface 338 is defined on a mold plate 323 of the first mold part 322. The mold connection interface 333 and the complementary connection interface 338 are configured to interconnect such that the first mold part 322 may be positioned with adjustment of the positioner 330. The mold connection interface 333 may, for example, be configured as a tapered recess and the complementary connection interface 338 on a taper pin that is fastened to a back face of the mold plate 323.

As shown in the enlarged portion of FIG. 8, the positioner 330 includes a connection block 332 that defines the mold connection interface 333 therein. The connection block 332 is configured to be recessed within a pocket 213 defined in the first platen 210. The positioner 330 further includes an actuator 334 that is connectable to the first platen 210 and to the connection block 332 for selective positioning of the connection block 332 within the pocket 213 in the direction shown.

The actuator 334 may include, for example, a bearing block 335 that is configured to slide across a top face of the first platen 210 overtop a connection bore 215 that passes through to the pocket 213. The bearing block 335 defines an inclined bearing surface 342 on which a cap block 337 is disposed. The cap block 337 may include a complementary inclined surface (not shown) on the bottom thereof. The actuator 334 also includes an adjustor 339 for connecting an upstanding flange 341 of the bearing block 335 with a side face of the cap block 337. In this example, the adjustor 339 is a jacking screw that may be selectively adjusted, in use, to reposition the bearing block 335 relative to the cap block 337 and in so doing adjust a height of the cap block 337 over the top of the first platen 210 (by means of a wedging action). Lastly, the actuator 334 includes a link 336 for connecting the cap block 337 with the connection block 332, whereby with adjustment of the height of the cap block 337 the connection block, and the first mold part 122 that is connected thereto, is repositioned therewith.

Figure 10:
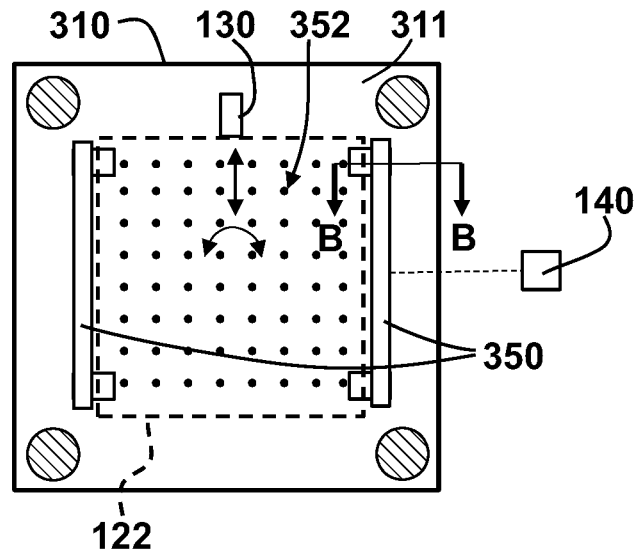
FIG. 10 depicts a schematic front view of a seventh non-limiting embodiment of a first platen of an injection molding machine that includes a positioner, clamp and array of recessable bearings thereon.

With reference to FIG. 10, it may be appreciated that a first platen 310 of the injection molding machine may include the positioner 130 and a clamp 350 that is configured to selectively clamp the first mold part 122 (shown in outline) to the first platen 310 and alternately floatably retain the first mold part 122 on the mold mounting face 311 of the first platen 310 during repositioning thereof with the positioner 130. In addition, it may be appreciated that the first platen 310 further includes an array of recessable bearings 352 on the mold mounting face 311 thereof that facilitate repositioning of the first mold part 122 with release of the clamp 350 to provide for floating of the first mold part 122 thereon.

Figure 11A:
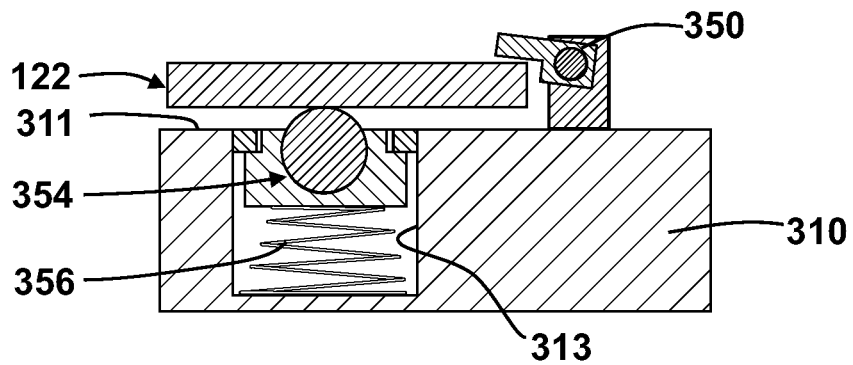
FIG. 11A depicts a schematic sectional view of part of the structure of FIG. 10, along line B-B, that illustrate the clamp and recessable bearing in a first operational configuration.
Figure 11B:
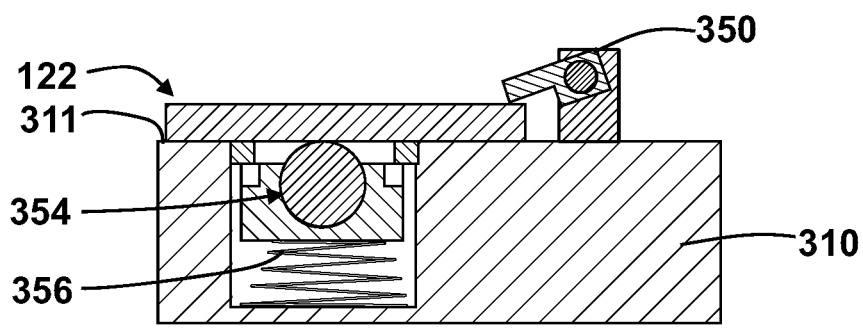
FIG. 11B depicts a schematic sectional view of part of the structure of FIG. 10, along line B-B, that illustrate the clamp and recessable bearing in a second operational configuration.

The structure and operation of the foregoing may be further appreciated by contrasting FIGS. 11A and 11B, wherein the clamp 350 and representative one of the array of recessable bearings 352 are shown in a first and a second configuration respectively. In the first configuration the first mold part 122 is floatably retained by clamp 350 and is supported for movement on the recessable bearings 352. In the first configuration each roller bearing 354 of the array of recessable bearings 352 is biased, by a spring 356, to project, in part, from a bore 313 defined in the first platen 310. In the second configuration the first mold part 122 is clamped to the mold mounting face 311 of the first platen 310 with full application of the clamp 350 and in so doing the array of recessable bearings 352 are recessed into the first platen 310.

Figure 12:
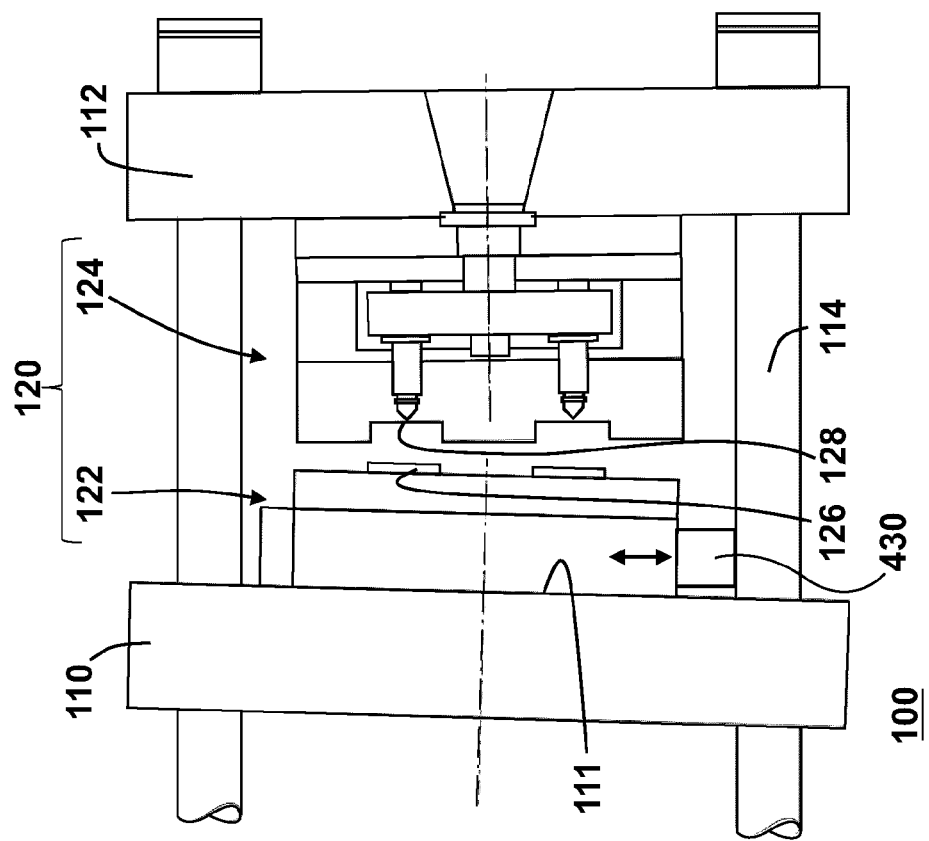
FIG. 12 depicts the schematic representation of an injection molding system and positioner in accordance with an eighth non-limiting embodiment.

With reference to FIG. 12, it may be further appreciated that the positioner 430 need not be configured in every case to connect the first mold part 122 to the first platen 110. For example, in this non-limiting embodiment the positioner 430 is instead configured to slide on a pair of tie bars 114 of the injection molding machine 100.

Figure 13:
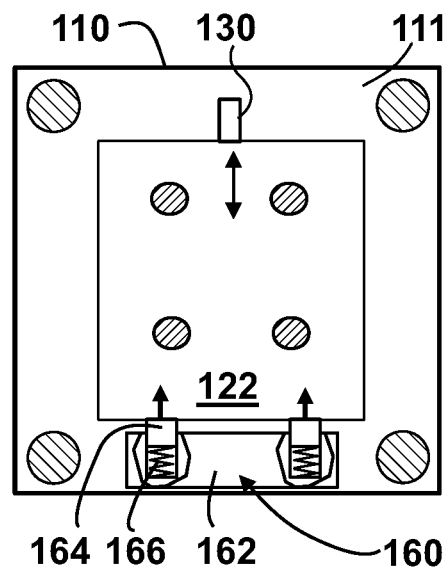
FIG. 13 depicts a schematic front view of an ninth non-limiting embodiment of a first platen of an injection molding machine that includes a weight compensator for supporting part of a weight of the first mold part thereon.

With reference to FIG. 13, it may be further appreciated that the first platen 110 may be further equipped with a weight compensator 160 that is configured to support part of a weight of the first mold part 122 during the repositioning thereof across the mold mounting face 111 of the first platen 110. The weight compensator 360 may include, for example, a mounting block 162 that is configured to mount to the mold mounting face 111 of the first platen 110 beneath the first mold part 122 and a bearing block 164 that is biased by a spring 166 to slidably extend from the mounting block 162 and supportively contact a bottom face of the first mold part 122. A technical effect of providing a weight compensator may include that the positioner 130 may be configured to handle only part of the weight of the first mold part 122 in order to affect repositioning thereof.

Figure 14:
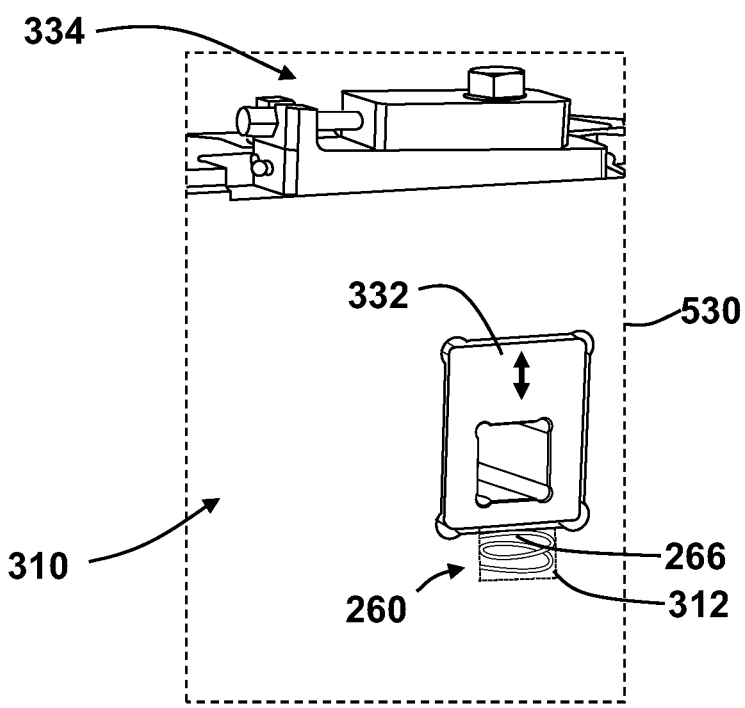
FIG. 14 depicts a schematic view of a tenth non-limiting embodiment of a first platen of an injection molding machine that includes a positioner thereon.

With reference to FIG. 14, a further non-limiting embodiment of a positioner 530 is shown that includes the structure of the positioner 330 as well as a weight compensator 260 that is integrated within a first platen 310 of a mold clamp (not shown) for supporting part of the weight of a mold part (not shown). In this embodiment the weight compensator 260 includes a spring 266 that is arranged within a bore 312 that is defined in the platen 310 beneath the connection block 332 of the positioner 330. In operation, the spring 266 provides an upwards force on the connection block 332 that offsets part of the weight of the first mold part.

Figure 15:
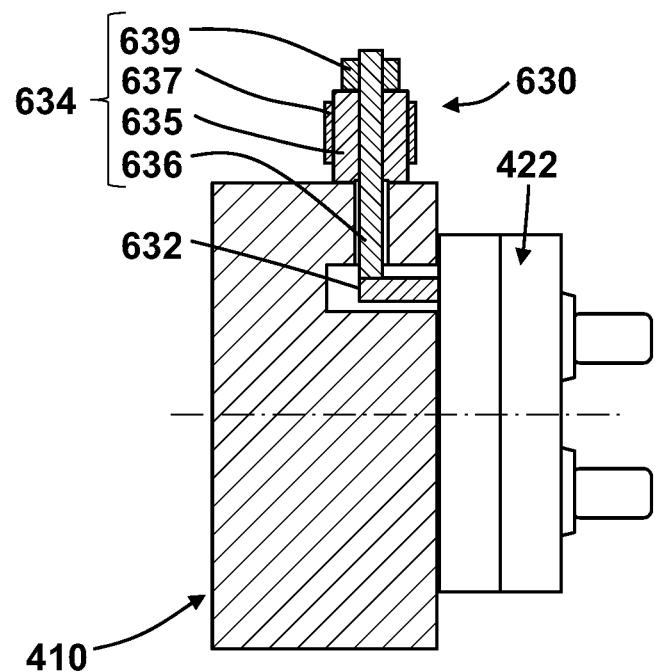
FIG. 15 depicts a schematic section view of an eleventh non-limiting embodiment of a first platen of an injection molding machine that includes a positioner thereon.

With reference to FIG. 15, yet another non-limiting embodiment of a positioner 630 is shown that connects a first platen 410 of a mold clamp (not shown) with a first mold part 422 of a mold (not shown). The positioner 630 includes an actuator 634 that is configured as a thermal jack. The working principle of the thermal jack makes use of the heat expansion property of materials to provide both precision positioning and high driving force. The actuator 634 includes a thermal block 635, such as steel, positioned on the first platen 410. A thermal device 637, in this example a heater, is mounted in contact with the thermal block 635 for adjusting a temperature thereof under the control of a controller (not shown). With adjustment of the temperature of the thermal block 635 its dimensions, such as length, may be changed. Connected to the thermal block 635 by means of a threaded nut 639 is a link 636 that passes through the thermal block 635 for suspending a connection block 632 therefrom. The connection block 635 connects with the first mold part 422. In operation, repositioning of the first mold part 422, vertically, may be provided with simple adjustment of the temperature of the thermal block 635. The foregoing may be done manually or automatically with reference to an alignment parameter of the mold.

The foregoing non-limiting embodiment serves to illustrate, amongst other things, that the working principle of the actuator within the positioner is not particularly limited. Other non-limiting examples of an actuator having a different working principle for use in a positioner for fine-positioning of a mold part may include, for example, piezo-electric, wedges, eccentric shaft, bolts with multiple threads, spring-loaded assist (reduction in force required to adjust the heavy load).

Figure 16:
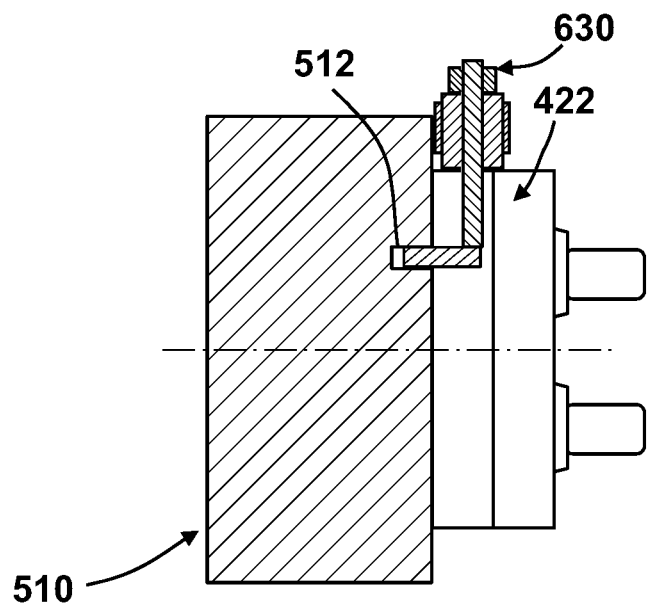
FIG. 16 depicts a schematic section view of a twelfth non-limiting embodiment of a positioner mounted to a first mold part.

With reference to FIG. 16, a simple variation of the foregoing is shown wherein the positioner 630 is mounted to the first mold part 422 instead of the first platen 410 (FIG. 15). In doing so, the connection block 632 registers within a bore 512 defined in a first platen 510 for connecting therewith. This embodiment merely serves to illustrate that the positioner of this and other embodiments may be mounted to the mold instead of the platen of the clamp.

In another non-limiting embodiment(s), not shown, the positioner may alternatively connect the second mold part with the second platen, wherein the positioner is adjustable to position the second mold part across a mold mounting face of the second platen. Likewise, both parts of the mold may be connected to their respective platens by a positioner.

Figure 17:
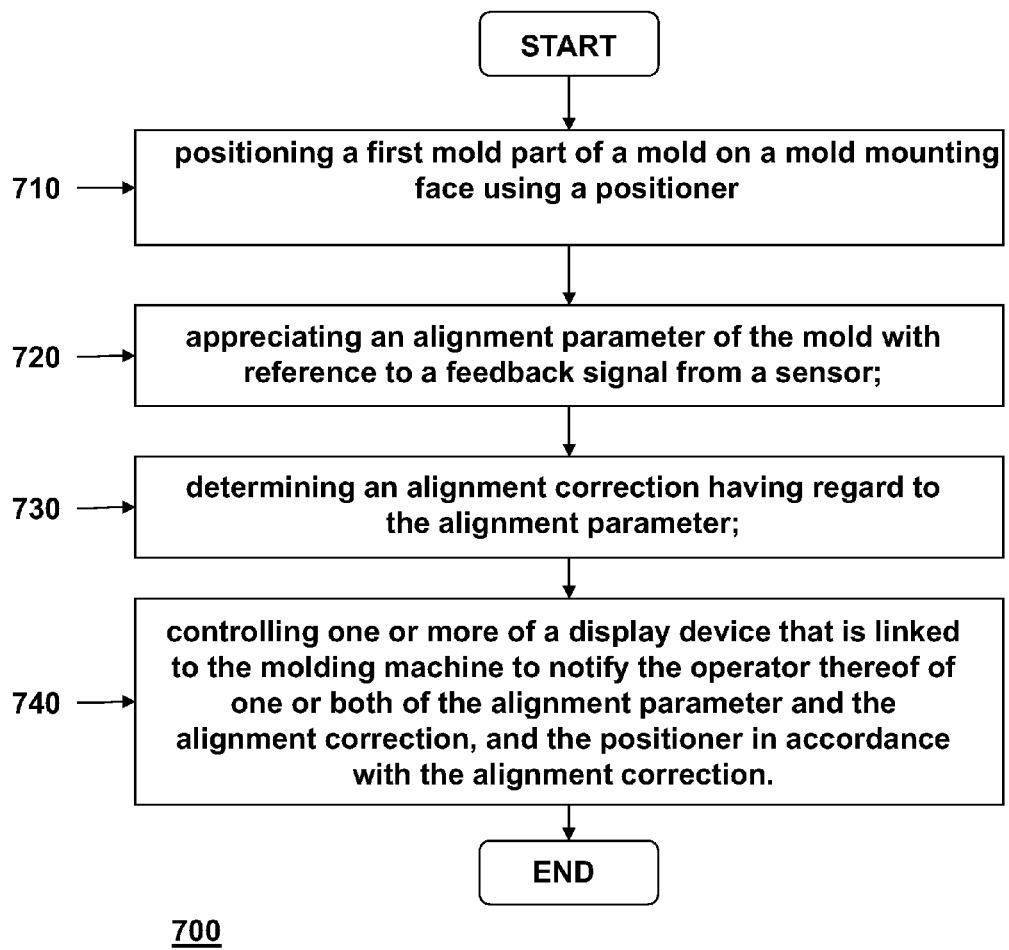
FIG. 17 depicts a flow chart of a non-limiting embodiment of a method for positioning the first mold part on the first platen.

In operation, the foregoing structure may be used to implement a method 700 of operating an injection molding system as depicted in the flow chart of FIG. 17. In particular, the method 700 broadly includes positioning (step 710) the first mold part 122, 222, 322 on the mold mounting face 111, 211, 311 with the positioner 130, 230, 330, 430 that is configured to connect the first mold part 122, 222, 322 to part of the injection molding machine. As previously mentioned positioning can include (not exhaustive) one or more of lifting, lowering, laterally shifting and/or rotating the first mold part 122, 222, 322 on the mold mounting face 111, 211, 311.

The method 700 may further include appreciating (step 720) the alignment parameter of the mold 120 with reference to the feedback signal from the sensor 142, 144, wherein the alignment parameter may be, for example, one or more of the position of the first mold part 122 on the mold mounting face 111 of the first platen 110 and/or a position of the first mold part 122 relative to the second mold part 124 of the mold 120 that is associated, in use, with a second platen 112 (FIG. 2) of the molding machine 100. The appreciation of the alignment parameter may be conducted periodically (i.e. cycle-to-cycle) or continuously. Likewise, the step may be performed manually, automatically or both.

The method 700 may further include determining (step 730) an alignment correction having regard to the alignment parameter, wherein one or more of the first mold part 122 has moved on the mold mounting face 111 of the first platen 110 outside of a pre-determined bound and/or the alignment between the first mold part 122 and the second mold part 124 being outside of a pre-determined range.

Lastly, the method 700 may further include controlling (step 740) one or more of the display device 146 that is linked to the molding machine 100 to notify the operator thereof of one or both of the alignment parameter and the alignment correction and/or controlling the positioner 130 in accordance with the alignment correction such as to return, for example, the first mold part 122 within one or both of the pre-determined bound and the pre-determined range.

Controlling the positioner 130 in accordance with the alignment correction (step 740) may further include the steps of releasing the clamp 350 (FIG. 10) to unclamp the first mold part 122 (shown in outline in FIG. 10) from to the first platen 310 while floatably retaining the first mold part 122 on the mold mounting face 311 thereon, repositioning the first mold part 122 on the mold mounting face 311 of the first platen 310 with selective adjustment of the positioner 130, and clamping the clamp 350 to clamp the first mold part 122 to the first platen 310.

Figure 18:
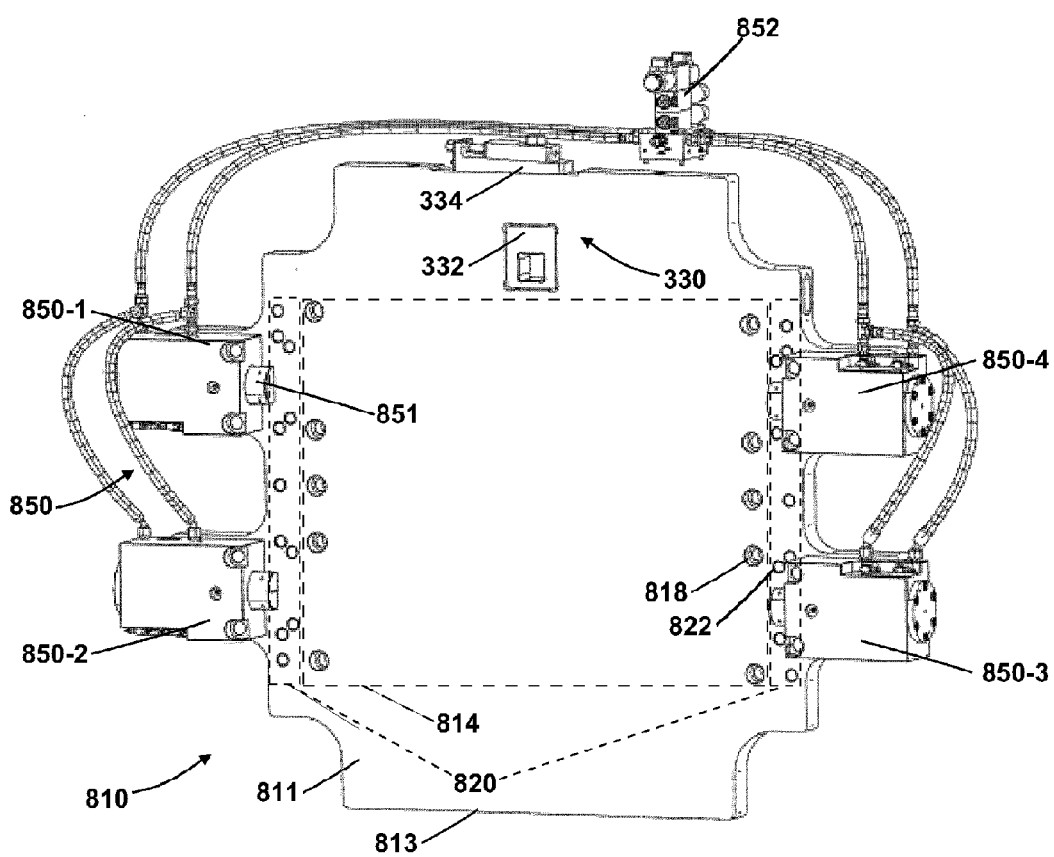
FIG. 18 depicts a non-limiting embodiment of a mold mounting device for mounting a mold to a platen of a molding machine that includes the positioner of FIG. 8.
Figure 1:
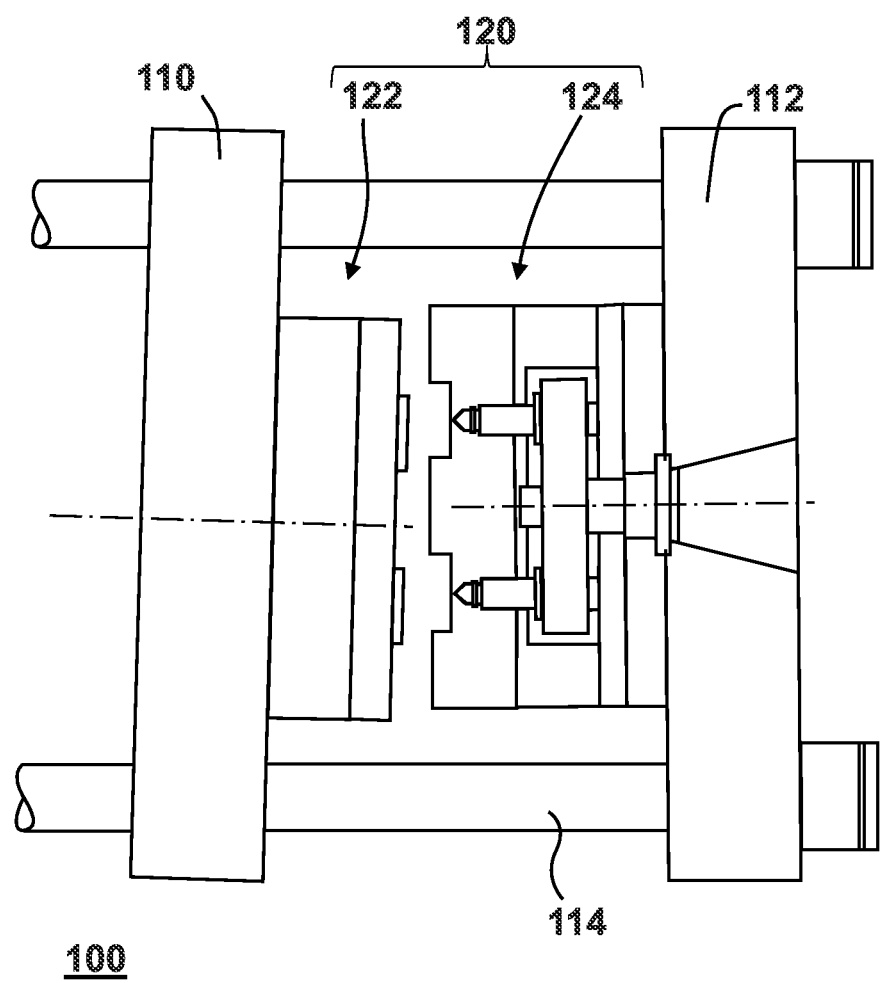
Figure 2:
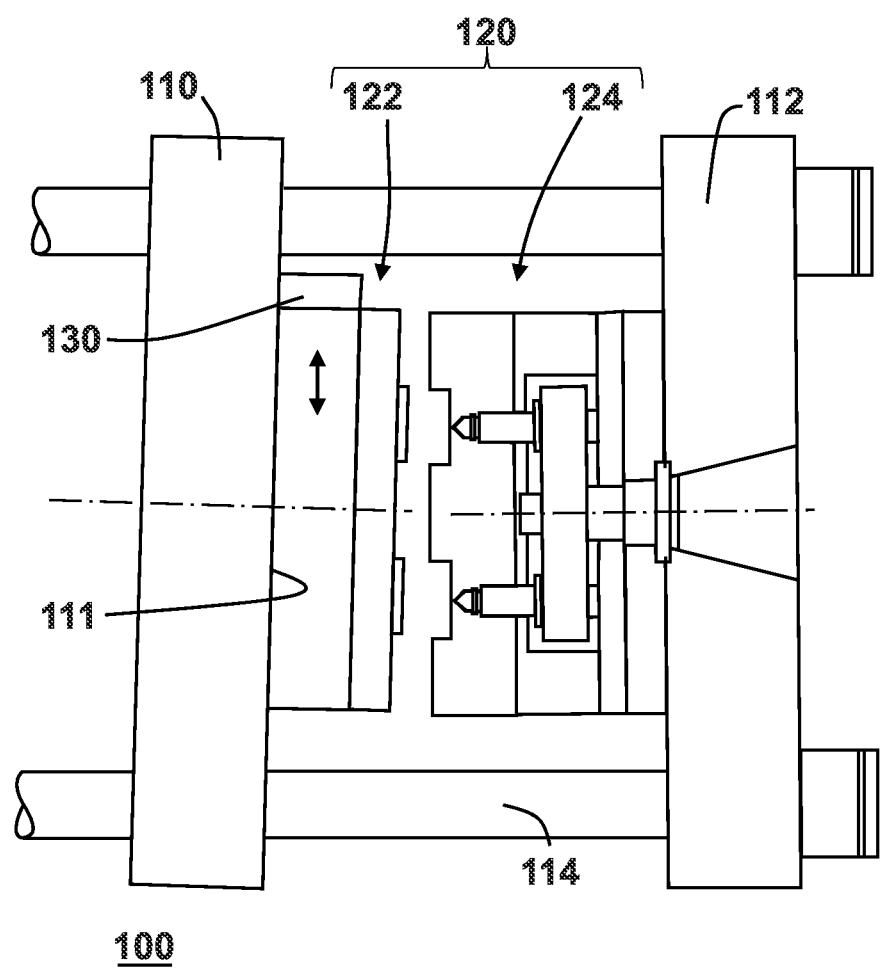
Figure 4:
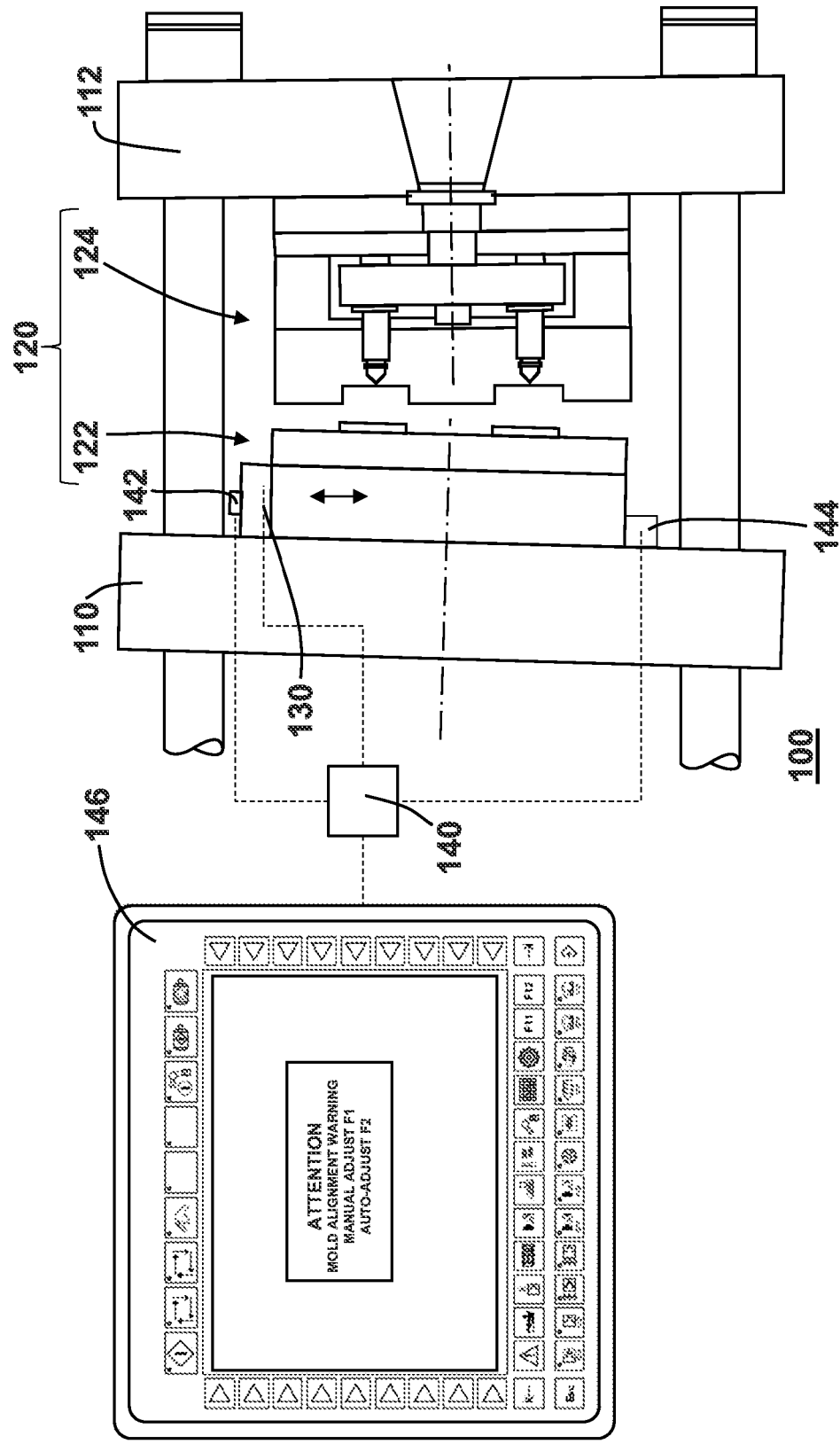
Figure 12:
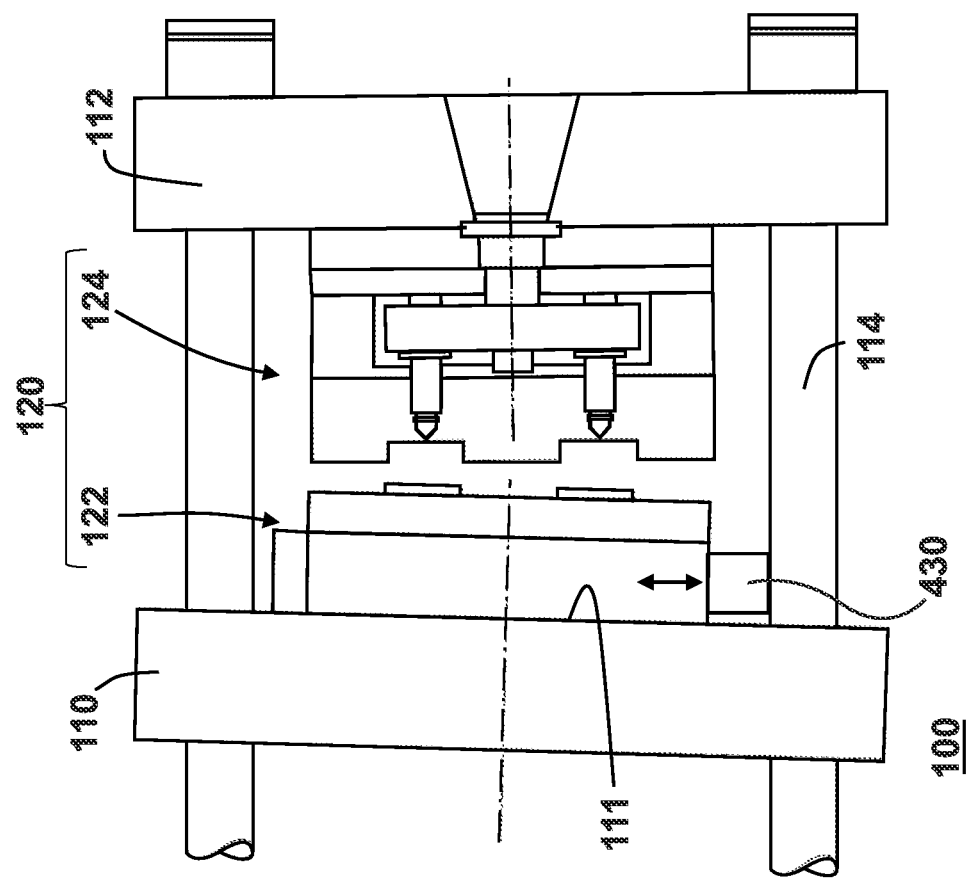

With reference to FIG. 18, there is depicted a non-limiting embodiment of a mold mounting device 810 that is configured for mounting part of a mold, such as the first mold part 322 shown in FIG. 9 and otherwise described previously, to a platen of a molding machine (not shown) and for positioning it thereon.

More specifically, the mold mounting device 810 comprises a mounting plate 813 that has platen mounting structure 814 for mounting the mounting plate 813 to the platen of the molding machine (not shown) and a mold clamp 850 for selectively clamping part of the mold mounted thereto. The mounting structure 814 may include, for example, an array of retainers 818 in the form of fastener bores that cooperate, in use, with fasteners, such as threaded bolts, not shown, to retain the mounting plate 813 to the platen. The mold clamp 850 includes a set of four clamps 850-1, 850-2, 850-3, 850-4 that are mounted on a mold mounting face 811 of the mounting plate 810 with a pair being positioned to each side of a region of the mold mounting face 811 on which the part of the mold is to be selectively mounted. Each of the clamps 850-1, 850-2, 850-3, 850-4 includes a clamping wedge 851 that is selectively positioned, in operation, to engage or disengage with a complementary part, not shown, to hold or to release, respectively, the part of the mold on the mounting device 810. The mounting plate 813 may further include a supplemental mold mounting structure 820 for bolstering the connection of the mold to the mounting plate 813. The supplemental mold mounting structure 820 may include a further array of retainers 822 in the form of threaded fastener bores that cooperate with threaded bolts that connect with the mold.

The mold mounting device 810 also includes the positioner 330 that was previously described in detail with reference to FIG. 8 with the exception that it is configured in the mounting plate 813 instead of the first platen 210 (FIG. 8). As such, the connection block 332 may recessed through the mold mounting face 811 into the mounting plate 813 and the actuator 334 mounted to a top face of the plate.

In use, the mold mounting device 810 may be mounted to the platen of the molding machine (not shown) and thereafter may be left mounted thereto as the part of the mold is loaded, positioned, or otherwise exchanged for part of a different mold. The mode of operation of the mold mounting device 810 may be generally described as including the operations of disengaging the mold clamp 850, engaging the complementary connection interface 338 (FIG. 9) of the first mold part 322 (FIG. 9) with the connection block 332, positioning 710 (FIG. 17) the first mold part 322 on the mold mounting face 811 with adjustment of the positioner 330, and thereafter engaging the mold clamp 850 to hold the first part of the mold 322 in place. At this point the supplemental mold mounting structure 820 may also be engaged to provide further assurance that the mold is held in place.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A structure for positioning a first mold part of a mold on a mold mounting face in an injection molding machine, comprising:
a positioner that is configured to connect the first mold part to part of the injection molding machine, wherein the positioner is adjustable to position the first mold part on the mold mounting face;
the positioner includes:
a connection block that is configured to be recessed within a pocket defined in one of the first platen or a mounting plate of the mold mounting device; and
an actuator that is connectable to one of the first platen and the mounting plate of the mold mounting device, and to the connection block for selective positioning of the connection block within the pocket;
wherein the connection block defines a mold connection interface that is configured to interconnect with a complementary connection interface that is defined on a mold plate of the first mold part.

2. The structure of claim 1, wherein:
the positioner is configured to perform one or more of:
lift and lower the first mold part across the mold mounting face;
laterally shift the first mold part across the mold mounting face; and
rotate the first mold part on the mold mounting face.

3. The structure of claim 2, wherein:
the positioner includes a plurality of positioners that are configured to connect the first mold part with the injection molding machine, wherein the plurality of positioners are selectively operable to coordinate positioning of the first mold part on the mold mounting face.

4. The structure of claim 1, further comprising:
controller executable instructions that are executable in a controller with which to resolve an alignment parameter of the mold using a feedback signal from a sensor.

5. The structure of claim 4, wherein:
the controller executable instructions are further configured to cause the controller to determine an alignment correction having regard to the alignment parameter.

6. The structure of claim 5, wherein:
the controller executable instructions are further configured to cause the controller to perform one or more of:
control a display device that is linked to the controller to notify the operator thereof of one or both of the alignment parameter and the alignment correction;
control the positioner in accordance with the alignment correction.

7. The structure of claim 5, wherein:
the sensor is arranged such that the controller may appreciate the alignment parameter that is one or more of:
a position of the first mold part on the mold mounting face of a first platen of the injection molding machine;
a position of the first mold part relative to a second mold part that is associated, in use, with a second platen of the injection molding machine.

8. The structure of claim 7, wherein:
the controller executable instructions for determining the alignment correction are responsive to one or more of:
the first mold part having moved on the mold mounting face of the first platen outside of a pre-determined bound;
alignment between the first mold part and the second mold part being outside of a pre-determined range.

9. The structure of claim 1, wherein:
the positioner is configured to mount to the first platen and provide a mold connection interface on the mold mounting face thereof that is configured to interconnect with a complementary connection interface that is defined on a mold plate of the first mold part.

10. The structure of claim 1, wherein:
the positioner is associated with a mold mounting device that is configured for mounting the first mold part to a first platen of the molding machine.

11. The structure of claim 10, wherein:
the mold mounting device further includes a mold clamp for selectively clamping the first mold part thereto.

12. The structure of claim 1, wherein:
the actuator includes:
a bearing block that is configured to slide across a top face of the first platen overtop a connection bore that passes through to the pocket;
the bearing block defines an inclined bearing surface;
a cap block disposable on the inclined bearing surface;
an adjustor for connecting the bearing block with the cap block, the adjustor being selectively adjustable for repositioning the bearing block relative to the cap block and in so doing adjust a height of the cap block over the top of the first platen; and
a link for connecting the cap block with the connection block.

13. The structure of claim 1, wherein:
the mold connection interface is a tapered recess that is defined in the connection block and the complementary connection interface is a taper pin that is fastened to a back face of the mold plate.

14. The structure of claim 1, wherein:
the positioner includes a weight compensator that is configured to support part of a weight of the first mold part during the repositioning thereof across the mold mounting face of the first platen.

15. The structure of claim 1, further comprising:
a clamp that is configured to selectively clamp the first mold part to the first platen and alternately floatably retain the first mold part on the mold mounting face of the first platen during repositioning thereof with the positioner.

16. The structure of claim 15, wherein:
the first platen includes an array of recessable bearings on the mold mounting face thereof that facilitate repositioning of the first mold part with release of the clamp to provide for floating of the first mold part thereon.

17. The structure of claim 1, further comprising:
a weight compensator that is configured to support part of a weight of the first mold part during the repositioning thereof across the mold mounting face of the first platen.

18. The structure of claim 17, wherein:
the weight compensator includes a mounting block that is configured to mount to the mold mounting face of the first platen beneath the first mold part and a bearing block that is biased by a spring to slidably extend from the mounting block and supportively contact a bottom face of the first mold part.

19. A method of operating an injection molding machine, the method comprising:
positioning a first mold part of a mold on a mold mounting face using a positioner that includes a connection block that is configured to be recessed within a pocket defined in one of a first platen of the injection molding machine or a mounting plate of a mold mounting device and an actuator that is connectable to one of the first platen and the mounting plate of the mold mounting device and to the connection block, wherein the connection block defines a mold connection interface that is configured to interconnect with a complementary connection interface that is defined on a mold plate of the first mold part;
wherein with positioning the connection block within the pocket using the actuator the first mold part is repositioned therewith.

20. The method of claim 19, wherein:
the positioning of the first mold part on the mold mounting face using the positioner provides for one or more of:
lifting and lowering the first mold part across the mold mounting face;
laterally shifting the first mold part across the mold mounting face; and
rotating the first mold part on the mold mounting face.

21. The method of claim 20, wherein:
the positioner includes a plurality of positioners, and wherein the positioning of the first mold part on the mold mounting face includes a coordinating adjustment of the plurality of positioners.

22. The method of claim 20, further comprising:
appreciating an alignment parameter of the mold with reference to a feedback signal from a sensor.

23. The method of claim 22, further comprising:
determining an alignment correction having regard to the alignment parameter.

24. The method of claim 23, further comprising:
controlling one or more of:
a display device that is linked to the injection molding machine to notify the operator thereof of one or both of the alignment parameter and the alignment correction; and
the positioner in accordance with the alignment correction.

25. The method of claim 24, wherein:
controlling the positioner in accordance with the alignment correction includes:
releasing a clamp, at least in part, to unclamp the first mold part from the mold mounting face of one of the first platen and a mounting plate of a mold mounting device;
repositioning the first mold part on the mold mounting face with selective adjustment of the positioner;
clamping the clamp to clamp the first mold part to the mold mounting face.

26. The method of claim 25, wherein:
the alignment parameter is one or more of:
a position of the first mold part on the mold mounting face;
a position of the first mold part relative to a second mold part of the mold that is associated, in use, with a second platen of the injection molding machine.

27. The method of claim 26, wherein:
determining the alignment correction having regard to the alignment parameter includes one or more of:
determining if the first mold part has moved on the mold mounting face within a pre-determined bound;
determining if the alignment between the first mold part and the second mold part is within a pre-determined range.

* * * * *

(12) EX PARTE REEXAMINATION CERTIFICATE (189th)
Ex Parte Reexamination Ordered under 35 U.S.C. 257

United States Patent
Brand et al.

(10) Number: US 9,868,239 C1
(45) Certificate Issued: Jan. 8, 2021

(54) MOLD POSITIONING DEVICE

(71) Applicant: HUSKY INJECTION MOLDING SYSTEMS LTD., Bolton (CA)

(72) Inventors: Dietmar Tiemo Brand, North York (CA); Ralf Walter Fisch, Sarrebourg (DE); Sven Kmoch, Platten (DE); Andre Axel Kromberg, Newmarket (CA); Adrian Peter Looije, Aurora (CA); Peter Adrian Looije, Newmarket (CA); Ruud Luijs, VR Utrecht (NL); Jan Marius Manda, Toronto (CA); Renato Papa, Scarborough (CA); Dirk Holger Schlums, Mansfield (CA); Alex Teng, Richmond Hill (CA); Jean-Christophe Witz, Yutz (FR); Bruno Giuseppe Sodaro, Erin (CA); Maxfield Paul Bradshaw, Etobicoke (CA)

(73) Assignee: HUSKY INJECTION MOLDING SYSTEMS LTD., Bolton (CA)

Supplemental Examination Request:
No. 96/000,330, Jun. 22, 2020

Reexamination Certificate for:
Patent No.: 9,868,239
Issued: Jan. 16, 2018
Appl. No.: 14/670,301
PCT Filed: Dec. 6, 2013
PCT No.: PCT/CA2013/050938
§ 371 (c)(1),
(2) Date: Jul. 10, 2015
PCT Pub. No.: WO2014/121372
PCT Pub. Date: Aug. 14, 2014

Related U.S. Application Data

(60) Provisional application No. 61/761,354, filed on Feb. 6, 2013, provisional application No. 61/840,095, filed on Jun. 27, 2013, provisional application No. 61/875,764, filed on Sep. 10, 2013.

(51) Int. Cl.
*B29C 45/47* (2006.01)
*B29C 45/80* (2006.01)
*B29C 45/17* (2006.01)

(52) U.S. Cl.
CPC .......... *B29C 45/80* (2013.01); *B29C 45/1742* (2013.01); *B29C 45/1743* (2013.01); *B29C 45/1756* (2013.01); *B29C 2945/76083* (2013.01); *B29C 2945/76227* (2013.01); *B29C 2945/76344* (2013.01); *B29C 2945/76568* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,330, please refer to the USPTO's public Patent Application Information Retrieval (PAIR) system under the Display References tab.

*Primary Examiner* — Elizabeth L McKane

(57) ABSTRACT

Disclosed herein, amongst other things, are structure and steps for positioning a first mold part of a mold on a mold mounting face in an injection molding machine. In particular, the structure and steps may include a positioner that is configured to connect the first mold part to part of the injection molding machine, wherein the positioner is adjustable to position the first mold part across the mold mounting face.

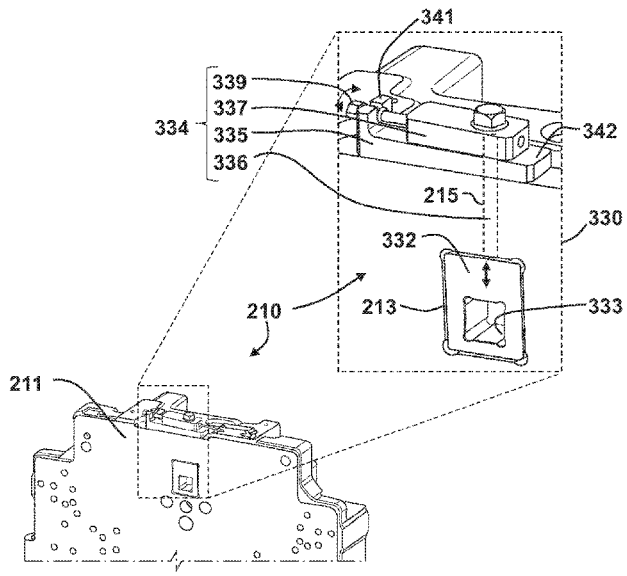

"Amended"

"Amended"

"Amended"

"Amended"

EX PARTE REEXAMINATION CERTIFICATE

THE PATENT IS HEREBY AMENDED AS INDICATED BELOW.

THE DRAWING FIGURES HAVE BEEN CHANGED AS FOLLOWS:

Reference numerals 126 and 128 have been removed from Figures 1, 2, 4, and 12.

AS A RESULT OF REEXAMINATION, IT HAS BEEN DETERMINED THAT:

The patentability of claims 1-27 is confirmed.

\* \* \* \* \*